United States Patent [19]

Dowell et al.

[11] 4,177,882
[45] Dec. 11, 1979

[54] MECHANICAL SNUBBING DEVICE WITH INERTIA ACTUATED BRAKING MEANS

[75] Inventors: Terrence P. Dowell, Van Nuys; Edwin L. Banks, Jr., Lakeview Ter., both of Calif.

[73] Assignee: Barry Wright Corporation, Watertown, Mass.

[21] Appl. No.: 775,260

[22] Filed: Mar. 7, 1977

[30] Foreign Application Priority Data

Apr. 8, 1976 [GB] United Kingdom ............... 14312/76

[51] Int. Cl.² .............................................. F16F 7/10
[52] U.S. Cl. .................................... 188/1 B; 188/185; 293/132
[58] Field of Search ............... 188/1 R, 1 B, 185, 134; 293/85, 89

[56] References Cited

U.S. PATENT DOCUMENTS

| | | | |
|---|---|---|---|
| 1,972,643 | 9/1934 | Chapman | 188/184 X |
| 2,042,280 | 5/1936 | Stuart | 188/135 X |
| 2,856,179 | 10/1958 | Holan | 267/9 |
| 3,390,742 | 7/1968 | Hrusch | 188/1 B |
| 3,451,674 | 6/1969 | Lundgren et al. | 188/184 X |
| 3,756,351 | 9/1973 | Sasaki | 188/1 B |

*Primary Examiner*—Robert J. Spar
*Assistant Examiner*—Charles A. Marmor
*Attorney, Agent, or Firm*—Milton E. Gilbert

[57] ABSTRACT

A snubber apparatus having a pair of elements telescopically interconnected for relative movement with respect to each other through a ball nut or lead screw device, a braking surface on one of the elements, an inertia mass driven by the other of the elements, a support for the brake shoe and a lever coupled to the inertia mass and pivotally coupled to the support for urging the shoe against the braking surface.

9 Claims, 14 Drawing Figures

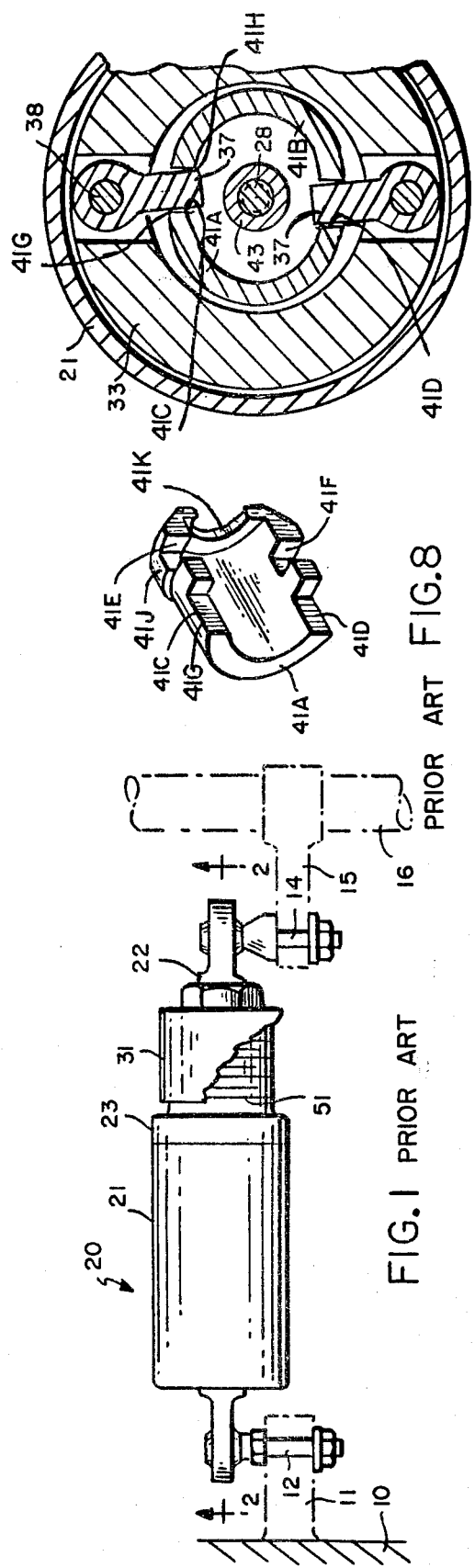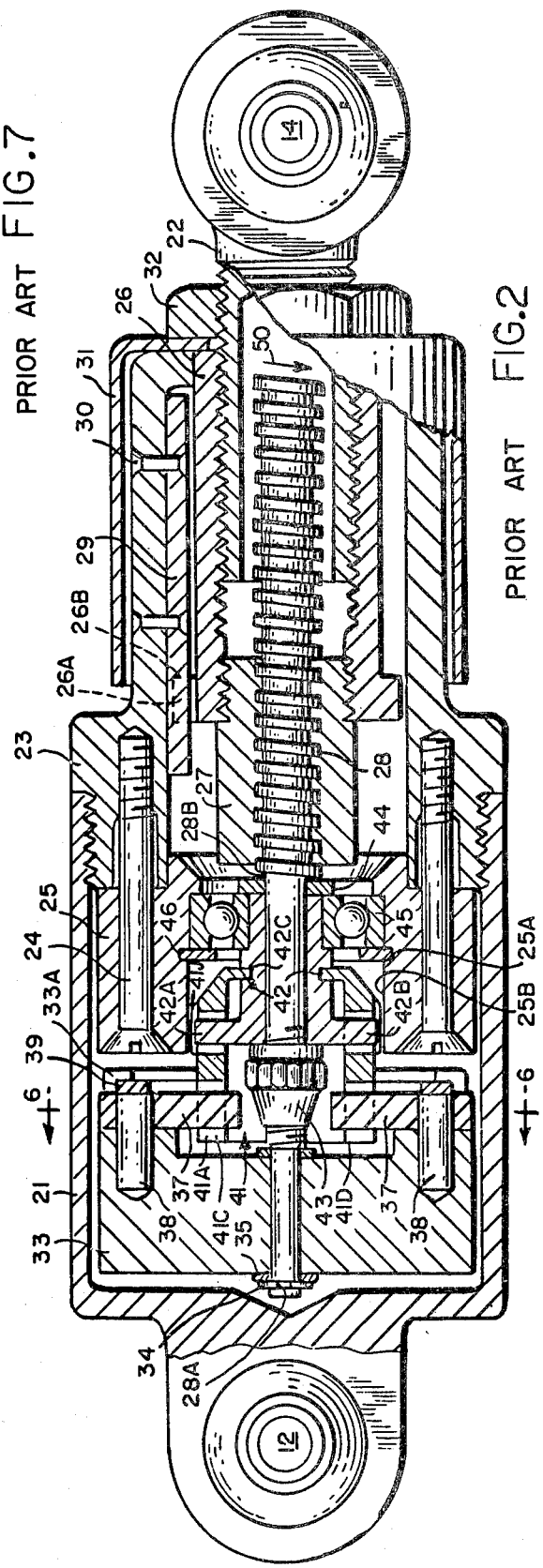

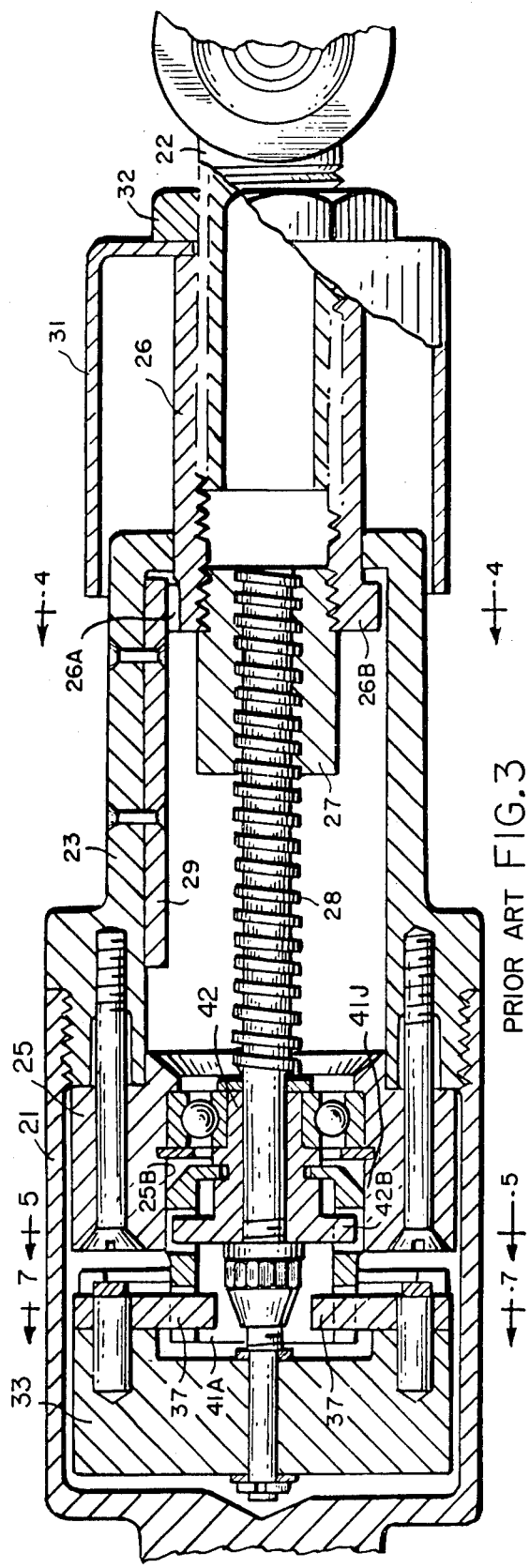
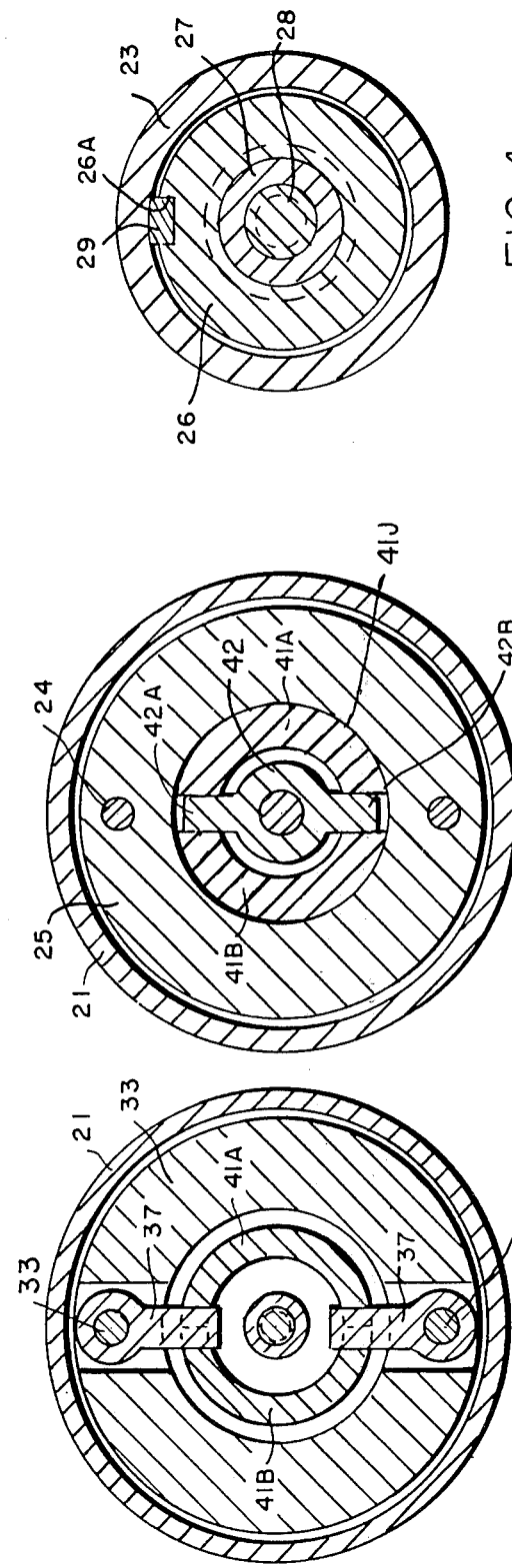
PRIOR ART FIG. 3
PRIOR ART FIG. 4
FIG. 5 PRIOR ART
FIG. 6 PRIOR ART

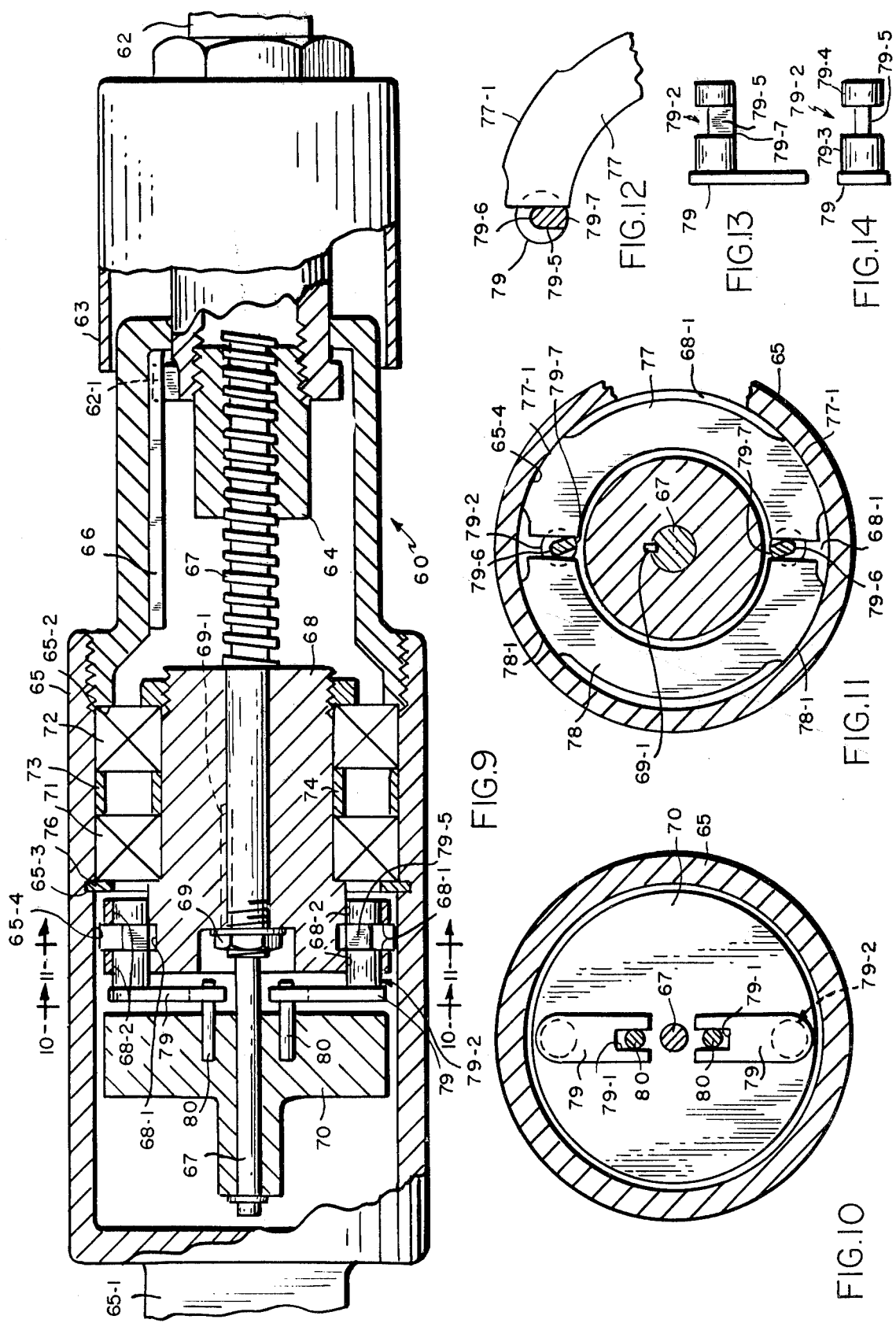

MECHANICAL SNUBBING DEVICE WITH INERTIA ACTUATED BRAKING MEANS

BACKGROUND OF THE DISCLOSURE

This invention relates to snubbers or shock absorbers and, more particularly, to a mechanical device for restraining portions of a power plant to withstand earthquakes while at the same time providing freedom for movement of those devices which undergo thermal expansion or contraction during use.

In recent years the increased demand for electrical power and the reduced availability of oil has resulted in a demand for the increased use of nuclear power to generate electricity. While the feasibility of nuclear power plants is not questioned, their construction has posed certain questions as to the ability of equipment such as emergency cooling lines or pipes, heat exchangers, etc., to withstand earthquakes.

Current thinking would appear to call for the cooling lines or pipes, etc., to be rigidly coupled to building structures. While this would be simple enought to accomplish, the problem is more complicated than first meets the eye.

Cooling lines generally undergo thermal expansion ranging from inches to feet during thermal heat-up and cool-down cycles. Thus some means must be provided to support cooling lines and other devices which undergo thermal expansion in a manner such that movement during thermal cycles may be easily accomplished while at the same time providing protection under dynamic conditions such as an earthquake.

In the past, power plants have generally relied upon hydraulic dampers to restrain cooling pipes. However, hydraulic dampers have come into disfavor since they leak, they generally have sealing problems in radiation environments and they have a history of high maintenance costs.

Accordingly, a new and improved snubber or restraining apparatus was needed for use in supporting power plant devices which would be totally mechanical, would contain no hydrocarbon fluids, or hydro carbon material, could sustain high temperature or nuclear radiation environments and remain operational as well as provide protection from high seismic forces while permitting expansion due to thermal cycles.

The present invention provides such an apparatus which will meet the aforementioned requirements. In addition, the present invention provides an apparatus which may be constructed without requiring the use of springs, however springs may be used if desired in some cases.

BRIEF SUMMARY OF THE DISCLOSURE

The present invention provides a snubber or restraining assembly which provides little resistance to thermal expansion or contraction during heat-up or cool-down of power plant devices such as cooling lines while at the same time providing linear resistance to the motion of such power plant devices under dynamic conditions, i.e., conditions in which the power plant devices and the structure (building) begins to rapidly separate from each other or move towards each other e.g., an earthquake.

In the preferred embodiment of the snubber of this invention, there is provided means for rotating e.g., a ball screw or lead screw, means for causing rotation of said means for rotating e.g., a ball nut threadily coupled to said ball screw, and means responsive to rotation of said means for rotating to increase the resistance against rotation provided by said means for rotating with respect to said means for causing rotation under seismic conditions or relative acceleration of the end fittings.

In the preferred embodiment, resistance to angular acceleration is provided by a brake assembly coupled to an inertia mass which when abruptly rotated under dynamic conditions will cause the braking assembly to increase resistance to angular acceleration of said ball screw and thus translational or linear acceleration of the ball nut.

BRIEF DESCRIPTION OF THE DRAWINGS

FIG. 1 is a side elevation showing a snubber of the prior art according to United States Patent Law coupled between two structures;

FIG. 2 is a sectional view taken along line 2—2 in FIG. 1 illustrating the snubber in a fully retracted condition;

FIG. 3 is a sectional view similarly illustrating the snubber in an extended condition;

FIG. 4 is a sectional view taken along line 4—4 in FIG. 3;

FIG. 5 is a sectional view taken along line 5—5 in FIG. 3;

FIG. 6 is a sectional view taken along line 6—6 in FIG. 2;

FIG. 7 is a sectional view taken along line 7—7 in FIG. 3 illustrating the braking levers coupled to the inertia mass and urging the brake sections or shoes apart;

FIG. 8 is an isometric view of the left brake section or segment of the pair of brake shoes;

FIG. 9 is a partial sectional view similar to FIG. 2 which illustrates a snubber having a modified braking mechanism having a greater effective mechanical advantage over that shown in FIGS. 1 to 8;

FIG. 10 is a sectional view taken along line 10—10 in FIG. 9;

FIG. 11 is a sectional view taken along line 11—11 in FIG. 9;

FIG. 12 is an enlarged view illustrating one of the brake shoes and a portion of the lever shown in section; and FIGS. 13 and 14 are partial views of portions of the levers used in this invention.

DETAILED DESCRIPTION OF THE DISCLOSURE

Reference should now be had to FIGS. 1-8 for a detailed description of the snubber or shock absorber of the prior art according to United States Patent Law. At 10 there is shown a building structure to which there is coupled a stationary bracket 11 in which a pin 12 is adapted to be supported.

The pin 12 is carried by the snubber 20 of the invention at one end thereof. The opposite end of the snubber is coupled by a pin 14 to a second stationary bracket 15 coupled or clamped to a structure e.g., a pipe or cooling line 16.

The snubber 20 comprises a first outer housing assembly 21 and a rod end assembly 22. Coupled to the first outer housing assembly 21 is a second outer housing assembly 23. Screws 24 are provided and secure a bearing housing 25 to said housing assembly 23. An internal housing or slide 26 is threadably coupled to the rod end 22 as well as to a ball screw nut 27, e.g., (SAGINAW) which threadably engages a ball screw 28. The internal housing 26 is slideable from the retracted position in FIG. 2 to an extended position in FIG. 3 and is further adjustable with respect to rod end assembly 22 to a fully extended position (not shown). The slide is prevented from rotating by a key or guide 29 supported by rivets 30 which are positioned in a keyway 26A in collar 26B of the internal housing or slide 26.

A cover 31 is secured against the internal housing 26 by a nut 32 threadably coupled to the rod end 22. At 33 there is shown an inertia mass or wheel supported for free rotation on one end of the ball screw 28.

The inertia mass 33 is prevented from sliding off the screw 28 by a snap-ring 34 which fits into groove 28A of the screw.

A washer 35 is positioned between the snap-ring 34 and the inertia mass 33. The inertia mass 33 supports a pair of brake levers 37 by pins 38. The pins 38 are retained in place by a snap-ring 39 which rests against a rear flange 33A of the inertia mass 33.

At 41 there is provided a brake set comprising two brake shoes or sections 41A and 41B. The levers 37 are positioned in open slots 41C and 41D for use between the brake sections. The brake sections also provide second slots 41E and 41F in which there are positioned arms 42A and 42B of a driver 42. The driver 42 is secured to the ball screw 28 for rotation therewith by a double hex-nut 43 threaded on the ball screw 28. To the rear of the driver is a washer 44 which engages a shoulder 28B of the ball screw 28.

The brake sections have an internal flange 41K which is positioned in a groove 42C of the driver. The driver 42 is supported as shown in a ball bearing assembly 45 and the bearing is locked within the bearing housing 25 by a snap-ring 46 which snaps into a groove 25A of the bearing housing 25.

The operation of the snubber apparatus of this invention is as follows: if for example, an earthquake causes acceleration of the building 10 away from the pipe 16, the slide 26 then begins to move to the right of FIG. 1.

This in turn pulls the ball nut 27 with it thus causing ball screw 28 to rotate as shown by the arrow 50. The acceleration of the ball screw 28 causes the driver 42 to rotate the brake sections or halves 41A and 41B which in turn through levers 37 accelerates the inertia mass 33.

A reaction force at the levers 37 acting at the edges 41G and 41H of the brake sections 41A and 41B respectively, is produced by the acceleration of the inertia mass 33. The levers 37 twist in the brake slots, 41C and 41D under this force, engaging alternately the inner and outer edges 41G and 41H of sections 41A and 41B, respectively, at slot 41C; and similarly at slot 41D, thereby contributing to the mechanical advantage of the levers 37.

The brake sections 41A and 41B are forced apart and the braking surface 41J is brought into contact with the inner surface 25B of the bearing housing 25. Additional mechanical advantage is obtained by the transmission of the braking force from surface 41J to react at groove 42C of driver 42.

Applying of the brakes increases the resistance of the ball screw to rotate in the ball nut and thus translates rotational resistance to linear resistance.

Upon reversal of the relative acceleration of the assemblies 21 and 22 caused by an earthquake, for example, the levers 37 reverse their positions in the slots 41C and 41D as a consequence of the reversed angular acceleration impressed on the inertia mass 33. The brake sections 41A and 41B once again contact braking surface 25B in the manner described above, to provide resistance to this acceleration. The resistance provided is proportional to the acceleration between the ends of the snubber 20.

As may be observed marks or rings 51 may be applied under the cover 31 on the member 23 to indicate the amount of extension of the snubber (as shown in FIG. 1).

Reference should now be had to FIGS. 9 to 14 for a description of the snubber 60 disclosed in these figures. The snubber 60 includes a first member 62 for coupling to a pipe in the same manner as shown for the snubber in FIG. 1. The member 62 is positioned in an outer housing 63 and threadly supports a ball nut 64. The member 62 includes a key 62-1.

A second member 65 shown as two parts is relatively movable with respect to member 62 and supports a keyway 66 (the same type as the keyway of FIG. 2) in which the key 62-1 is retained to prevent rotation of member 65 with respect to member 62 and thus limits movement to translation or linear motion. The member 65 has an end coupling 65-1 of the type shown in FIG. 1 to permit it to be coupled to a support structure.

The ball nut 64 supports a ball screw 67 for rotation. A driver 68 is coupled to screw 67 for rotation therewith by a lock nut 69. The driver is keyed at 69-1 so that it will rotate with screw 67. The screw 67 also supports an inertia mass 70 for free independent rotation.

The driver 68 is supported by roller bearing assemblies 71 and 72 held apart by spacers 73 and 74. The roller bearing assemblies are confined against translational movement by the shoulder 65-2 and a lock ring 76 snapped into a slot 65-3 formed in housing 65.

Other conventional means such as screws may be used to hold the bearing assemblies in place. The driver 68 includes a slot 68-1 formed at one end thereof in which brake shoes 77 and 78 are positioned for slideable radial motion (see FIG. 11).

The brake shoes include raised portions 77-1 and 78-1 for engaging the interior surface 65-4 of the member 65 which acts as a braking surface in order to prevent rotation of the driver under certain conditions.

In order to move the brakes 77 and 78 apart as shown in FIG. 11, levers 79 are coupled to pins 80 (see FIG. 10) by slots 79-1 provided therein. The other end of the levers 79 are provided with pins 79-2 which extend into and are supported for rotary motion in bores 68-2 in the driver 68. The pins 79-2 comprise the circular cross section 79-3 and 79-4 which are supported for rotary motion in the bores 68-2 (see FIGS. 9 & 14).

A center pin portion or camming lever 79-5 is provided between pin portions 79-3 and 79-4 for moving the brake shoes into engagement with the braking surface 65-4.

The pin portion 79-5 comprises an arc-shaped or round heel portion 79-6 which acts as a stop for one end of the brake shoes 77 or 78 as the other end of the brake shoes 77 or 78 are urged outwardly by camming lever portion 79-7 (see FIG. 11).

Thus in operation rotation of the pin section 79-5 causes one end of the brake 77 or 78 to pivot about pin portion 79-6 while the other end of the brake is urged upwardly so that the brake engaging surfaces 77-1 or 78-1 may contact the braking surface 65-4 of the member 65 (see FIG. 11).

The improved camming lever construction of FIGS. 9 to 14 boosts the effective mechanical braking advantage of the brake shoe since a force vector is produced by pin portion 79-7 as it is rotated at one end of the brake shoe which creates a movement about the round heel 79-6 of the lever thus increasing the braking force provided by brake shoe engaging portions 77-1 and 78-1 (see FIG. 11).

In operation rapid acceleration of said members 62 and 65, e.g., apart from one another, causes the ball nut 64 to rotate the ball screw 67. Since the inertia mass cannot, because of its mass, rotate as rapidly as the screw 67, it lags behind the screw.

This causes the levers 79 to be rotated causing the braking shoes 77 and 78 to be moved apart to engage the brake surface 65-4 (see FIG. 11) and thus slow the rotation of the driver 68 which is keyed 69-1 as shown in FIG. 11 for rotation with the screw. This, then slows the separation of the members 62 and 65. The same braking effect occurs if members 62 and 65 are rapidly driven towards each other rather than apart from each other.

Release of the brake shoes from engagement with the braking surface occurs as the inertia mass rotates towards the position as shown in FIG. 10 which rotates the levers 79 into the position as shown. The engagement of the brake shoes 77 and 78 with the braking surface 65-4 prevents the pins 80 from falling out of the slots 79-1 since the amount of rotation of the inertia mass with respect to the screw 67 is limited by the brake shoes engaging the braking surface.

It should be understood that under normal conditions, that is slow rotation of the screw, e.g., due to temperature changes, the inertia mass will move with the screw due to friction between it and the screw, however the inertia mass is adapted to rotate about the screw under high acceleration of the screw 67.

It will thus be seen that a purely mechanical apparatus has been provided which is suitable for use in a high temperature or earthquake prone environment and which is acceleration sensitive while being attitude (position) insensitive. The apparatus may be constructed entirely of metal, does not lock up and needs no hydraulic fluid or springs for operation.

We claim:

1. In a snubber, first and second concentrically arranged parts slidingly interengaged for relative movement with a portion of one part extending into the other, a nut fixed to one part, a driver rotatably mounted within the other part and a screw fixed at one end to the driver and rotatably engaged at its other end within the nut, a braking surface on the other part concentric with the axis of the screw, brake shoes mounted to the driver within and concentric to the braking surface having portions for engaging the braking surface, said driver being driven in rotation by the screw, an inertia mass positioned about the screw for free rotation, said brake shoes being supported by the driver for sliding radial motion and being rotated by the driver, a plurality of levers pivotally supported by the driver and coupled to said inertia mass, said levers including cam means having cam portions supported for rotation by said driver, slidingly engaged with the ends of the brake shoes, each camming portion including means for rotating the brake shoes about a portion of the heel end of another of the cam portions and a slot in the driver within which the brake shoes are confined for sliding motion.

2. In a snubber, a pair of members slidably interengaged for relative translational movement with respect to each other, a driver rotatably supported by one of the members for rotation about a predetermined axis, means associated with the other member operable by translational movement of the member to effect rotation of the driver, a braking surface on the one member concentric with the axis of rotation of the driver, braking means mounted to the driver having separable portions for engaging said braking surface, an inertia mass, brake activating lever means coupled to the inertia mass and to the braking means for moving apart the separable portions of the braking means to bring said portions into engagement with said braking surface, said brake activating lever means being pivotally supported by said driver and slot means in the driver confining the braking means to outward motion.

3. In a snubber, a pair of concentrically arranged members slidably interengaged for relative translational movement with respect to each other about a common longitudinal axis, a driver rotatably supported by one of the members for rotation about said axis, means connected to the other of the members operable by translational movement of the members to effect rotation of the driver, a braking surface on the one member concentric with the axis of rotation of the driver, braking means having separable portions supported by the driver for movement of their braking surfaces into engagement with the braking surface on the one member, an inertia mass, brake activating lever means coupling the inertia mass and driver for moving apart the separable portions of the brake means to bring said portions into engagement with said braking surface, said brake activating lever means being pivotally supported by said driver and including a portion with a slot which is positioned about a pin supported by said inertia mass.

4. In a snubber according to claim 3 in which said brake means is slideably supported by said driver.

5. In a snubber according to claim 4 in which said lever means include a camming lever portion supported by said driver for rotation to engage the brake means and urge it against said braking surface.

6. In a snubber according to claim 5 in which the camming lever portion engaging the brake means include a round heel portion about which said brake means moves.

7. A snubber according to claim 3 in which the first means comprises a screw nut assembly.

8. A snubber according to claim 3 in which the first means comprises a ball screw assembly.

9. A snubber comprising a pair of slidingly interengaged members mounted for relative translational movement with respect to each other and acceleration braking means for limiting translational movement of said members, said acceleration braking means including rotatable support means supported by one of said members for rotation about a predetermined axis longitudinally of the translational movement of the members, first means responsive to relative translational movement of said members for rotating said rotatable support means, an inertia mass rotatable about said axis, at least a pair of brake shoes supported by said rotatable support means, a braking surface on one of said members concentric with the axis of rotation with which a pair of the brake shoes are adapted to be engaged, at least a pair of levers pivotally supported by said rotatable support means for rotation therewith, said levers being operably connected to said inertia mass and responsive to said inertia mass for moving said pair of brake shoes against said braking surface, said levers combining to urge said braking shoes against said braking surface and including pins, each of which has a portion which acts as a stop for said pair of brake shoes and another portion which acts as a cam for said brake shoes.

* * * * *